United States Patent [19]

McLaughlin

[11] Patent Number: 5,526,426
[45] Date of Patent: Jun. 11, 1996

[54] SYSTEM AND METHOD FOR AN EFFICIENTLY CONSTRAINED FREQUENCY-DOMAIN ADAPTIVE FILTER

[75] Inventor: Hugh J. McLaughlin, Mountain View, Calif.

[73] Assignee: Signalworks, Mountain View, Calif.

[21] Appl. No.: 336,263

[22] Filed: Nov. 8, 1994

[51] Int. Cl.$^6$ .............................. H04M 9/08; H04B 3/23
[52] U.S. Cl. .......................... 379/411; 379/410; 379/406; 370/32.1
[58] Field of Search .................................. 379/388, 406, 379/407, 408, 409, 410, 411; 370/32.1

[56] References Cited

U.S. PATENT DOCUMENTS

| | | | |
|---|---|---|---|
| 4,633,046 | 12/1986 | Kitayama et al. | 370/32.1 |
| 4,636,586 | 1/1987 | Schiff | 379/390 |
| 4,658,426 | 4/1987 | Chabries et al. | 381/94 |
| 4,807,173 | 2/1989 | Sommen et al. | 364/724.18 |
| 4,903,247 | 2/1990 | Van Gerwen et al. | 367/135 |
| 4,951,269 | 8/1990 | Amano et al. | 379/406 X |
| 5,117,418 | 5/1992 | Chaffee et al. | 370/32.1 |
| 5,278,900 | 1/1994 | Van Gerwen et al. | 379/410 |
| 5,416,845 | 5/1995 | Shen | 381/71 |
| 5,463,618 | 10/1995 | Furukawa et al. | 370/32.1 |
| 5,477,534 | 12/1995 | Kusano | 370/32.1 |

OTHER PUBLICATIONS

Prado, J. et al., "Frequency–Domain Adaptive Filtering with Applications to Acoustic Echo Cancellation," Apr. 26, 1994, pp. 1–11.

Borrallo, J. M. P. et al., "On the Implementation of a Partitioned Block Frequency Domain Adaptive Filter (PBFDAF) for Long Acoustic Echo Cancellation," *Signal Processing*, vol. 27, No. 3, Jun. 1992, pp. 301–315.

Asharif, M. F. et al., "Frequency Bin Adaptive Filtering (FBAF) Algorithm and Its Application to Acoustic Echo Cancelling," *IEICE Transactions*, vol. E 74, No. 8, Aug. 1991, pp. 2276–2282.

Soo, J. et al., "Multidelay Block Frequency Domain Adaptive Filter," *IEEE Transactions on Acoustics, Speech, and Signal Processing*, vol. 38, No. 2, Feb. 1990, pp. 373–376.

Clark, G. A. et al., "A Unified Approach to Time—and Frequency–Domain Realization of FIR Adaptive Digital Filters," *IEEE Transactions on Acoustics, Speech, and Signal Processing*, vol. ASSP–31, No. 5, Oct. 1983, pp. 1073–1083.

*Primary Examiner*—Jeffery Hofsass
*Assistant Examiner*—Scott L. Weaver
*Attorney, Agent, or Firm*—Schneck & McHugh

[57] ABSTRACT

A multi-block frequency-domain adaptive filter in an acoustic echo canceller as applied to a full-duplex speakerphone includes convolving a received reference signal with a linear room model to generate an echo free signal for transmission which, in turn, is used to adapt the coefficients of the room model. The frequency-domain estimated echo response is transformed into the time-domain to generate an approximated time-domain echo signal which is subtracted from a microphone signal containing a desired intelligence signal and the actual echo to produce an outgoing signal. The outgoing signal serves as an error signal used to adapt the filter. In the preferred embodiment, a weighting means adjusts the frequency-domain room coefficients during the convolution operation. In another embodiment, a weighting means adjusts the frequency-domain room coefficients by adjusting the correlation terms during adaptation of the frequency-domain room coefficients. A constraint operation operating in conjunction with a constraint scheduler is employed to selectively constrain certain ones of the frequency-domain room coefficients. This offers the benefits of a fully constrained adaptation method, while effectively minimizing the necessary computations of such a constraint operation.

16 Claims, 4 Drawing Sheets

SYSTEM AND METHOD FOR AN EFFICIENTLY CONSTRAINED FREQUENCY-DOMAIN ADAPTIVE FILTER

TECHNICAL FIELD

The invention relates to frequency-domain adaptive filters, and in particular to a device and a method for a block frequency-domain adaptive filter as applied to acoustic echo cancellation in a full-duplex speakerphone device.

BACKGROUND ART

To date, most speakerphones operate in a half-duplex mode; i.e. only one caller can be heard at a given instant. A half-duplex arrangement imparts an annoying chopping of speech as the near-end caller and the far-end caller attempt to speak at the same time. A full-duplex speakerphone, on the other hand, allows for the near-end and far-end callers to talk simultaneously, thus avoiding the distracting interruption of speech.

Full-duplex speakerphones, however, suffer a problem due to the regenerative effects of acoustic echo paths that occur between the speaker and the microphone. The problem manifests itself as audible echo and possibly a howlback condition as the echo is retransmitted and re-amplified between the near-end and far-end speakerphones. An acoustic echo canceller (AEC) is commonly employed to eliminate these problems.

In general, an AEC is an adaptive filter which models the acoustic response of a room. A modeling component generates an estimate of the echo signal that will be formed by the room using an incoming signal from a far-end caller. The filter operates on an outgoing signal which includes a speech signal of the near-end caller and echo signals resulting from acoustic reflections of the incoming signal within the room. A "clean" signal, formed by subtracting the estimated echo signal from the outgoing signal, is then transmitted to the far-end caller. By comparing the "clean" signal to the incoming signal, an adaptation component of the AEC adapts the filter to more accurately approximate the room response.

An AEC performs a computationally demanding task. To model the room response, it is typical to have a 2000 tap filter capable of computing the next sample at a rate of 8000 Hz for a normal telephone channel. The AEC is generally implemented on some type of digital processor such as a microprocessor, a digital signal processor (DSP), a microcontroller or an application specific digital integrated circuit (digital ASIC).

The room response modeled by AECs is generally a linear model, consisting of a series of coefficients which represent the strength of the acoustic signal for a period of time. Pragmatic AECs have used the finite impulse response (FIR) filter as the model. The coefficients of the FIR filter are usually adapted by a least mean squares (LMS) technique to match the room response. This is referred to as the time-domain LMS technique. Time-domain LMS has the advantage of operating without imposing any significant delay between accepting the outgoing signal from the near-end speakerphone, which contains the desired near-end speech and the undesired room echo, and generating the "clean" signal for subsequent transmission to the far-end speakerphone. However, this quick response time is obtained at the expense of a computationally demanding process. Moreover, the rate of convergence, i.e. the time it takes for a filter to adapt its parameters to adequately model the acoustic characteristics of the room, using the time-domain LMS approach is very slow because voice signals are so highly correlated.

The most popular alternative to the time-domain LMS technique which exhibits improved convergence performance is a method known as subband filtering. Subband filtering divides the input signal into separate frequency bands for subsequent processing. This divide-and-conquer approach converges faster than the standard time-domain LMS method because there is less correlation between samples in each subband. However, the tradeoff is an increase in delay due to the necessary additional processing of a polyphase filter at the front end of the subband filter to compute the initial subband filter banks.

It has been well known that dramatic computational savings can be realized by performing the computations of the FIR filter in the frequency-domain instead of operating in the time-domain. See generally Clark et al., "A Unified Approach to Time—and Frequency-Domain Realization of FIR Adaptive Digital Filters," Vol. ASSP-13, No. 5, *IEEE Transactions on Acoustics, Speech, and Signal Processing*, pages 1073–1083 (October 1983) and U.S. Pat. No. 4,807,173 to Sommen et al. Frequency-domain filtering employs the same basic approach as described above, except that the signals are processed in the frequency-domain. Thus, a time-domain incoming (input) signal is sampled and converted to the frequency-domain, using for example a particular implementation of the Discrete Fourier Transform (DFT) known as the fast Fourier transform (FFT). A frequency-domain model of the room response is used to generate a frequency-domain estimate of the expected echo, which is converted to the time-domain and subtracted from a time-domain representation of the outgoing signal. The subtracted signal is 1) sent to the far-end caller and 2) is used by the AEC as an error signal to adapt the frequency-domain model of the room response. These frequency-domain quantities, called DFT vectors, are complex vectors whose elements correspond to a frequency. The individual elements of each vector are commonly called bins. The basic approach just described suffers from long delays needed to acquire a sufficiently large sample of the input signal to compute the necessary FFT. These delays would result in noticeable periods of silence which would tend to be very distracting to the human listener.

To minimize delay while achieving efficiency, a better implementation of a frequency-domain adaptive filter is to have a multiplicity of smaller blocks of DFT vectors, and to perform the filtering operation using these smaller blocks. The processing steps are essentially the same as in the non-blocked approach. However, the room response in this block frequency-domain adaptive filter, is modeled using an array consisting of smaller frequency-domain coefficient vectors to provide an estimate of the echo response. Each of the smaller vectors approximates a portion of the echo response because each vector represents a smaller period of time. Furthermore, each vector approximates a portion of the echo response for a different window of time such that the complete echo response is a composite of the partial echo responses. See generally, Asharif, M. R. et al., "Frequency Bin Adaptive Filtering (FBAF) Algorithm and Its Application to Acoustic Echo Cancelling," *I.E.I.C.E. Transactions*, Vol. E 74, No. 8, August 1991, pp. 2276–2282 and Soo, J. et al., "Multidelay Block Frequency Domain Adaptive Filter," *IEEE Transactions on Acoustics, Speech, and Signal Processing*, Vol. 38, No. 2, February 1990, pp. 373–376.

Adaptation of the block frequency-domain coefficient vectors involves a correlation between the error signal and the input signal. The frequency-domain coefficient vectors are adjusted by addition of the resulting correlation vectors, so that the filter characteristics will move in the direction to minimize residual echo in the error signal.

To date, frequency domain adaptation has proceeded in one of two ways: constrained and unconstrained. A constrained adaptation involves additional processing of the N frequency-domain correlation term. In the constraint operation, the frequency-domain correlation terms are transformed into N corresponding time-domain terms. The last N/2 time-domain terms are set to zero to eliminate the circular component. These constrained time-domain terms are then transformed back to the frequency-domain.

From a theoretical point of view, it is preferred that the frequency-domain coefficient vectors are adapted in a constrained manner. The reason is that unconstrained adaptation results in a build-up of a "circular convolution" component in the frequency-domain coefficients which causes corruption of the coefficients. By constraining the time-domain correlation terms, a linear convolution results, thus avoiding the occurrence of circular convolution altogether. Constrained adaptation, however, involves two additional DFTs per coefficient vector, and therefore imposes additional computational burdens on the AEC. On the other hand, the unconstrained technique converges at a slower rate and, in the steady state, converges to less accurate coefficient vectors, resulting in a less accurate model of the room response. Moreover, by using the unconstrained approach, the circular convolution component may be large enough to produce distracting audible artifacts.

A further consideration is the fact the echoes resulting from reflections off the walls, the furniture and other objects in the room exhibit a decaying response. While the echo signal decays over time, the strength of the noise component remains substantially undiminished. Left uncompensated, this masking effect will tend to destabilize the filter, thus slowing the rate of convergence and the long-term accuracy of the filter.

An approximation to a constrained adaptation approach is described in U.S. Pat. No. 4,807,173 to Sommen et al., which relies on the fact that multiplication of the time-domain window function is equivalent to a convolution of the window function in the frequency-domain. Sommen et al. define a specialized time-domain window function to approximate the effect of a DFT-based constraint operation such that the frequency-domain convolution operation reduces to three multiplication operations. Sommen et al. do not disclose a method which addresses the masking effect of the additive noise due to the presence of a decaying echo response.

An unconstrained adaptive filter is described in U.S. Pat. No. 5,117,418 to Chaffee et al. However, Chaffee et al. discuss the analogous situation of cancellation of echoes originating from the imperfections found in the equipment located at the local telephone switching office. The technique is commonly known as line echo cancellation (LEC).

An unconstrained adaptive filter is advocated in an article by J. M. P. Borrallo et al., "On the Implementation of the Partitioned Block Frequency Domain Adaptive Filter (PBFDAF) for Long Acoustic Echo Cancellation," Vol 27, No. 3, *Signal Processing*, pages 301–315 (June 1992). Borrallo et al. teach that the unconstrained approach is computationally efficient, and that under some favorable conditions, the approach converges to the Wiener solution. However, given that speakerphones are used in a wide variety of operating environments, it cannot be assumed that the favorable conditions anticipated by Borrallo et al. will be present in any particular situation. The paper also addresses the destabilizing effect of the additive noise masking the echo signal as it decays over time, and describes a progressive attenuation method applied during the cross-correlation step as a way of ensuring filter stability.

It is an object of the present invention to provide an efficient system and method of echo cancellation for use in a full-duplex speakerphone, which exhibits a fast convergence and is less sensitive to noise.

It is yet another object of the present invention to provide a system and method of echo cancellation which can be performed with minimal computational overhead.

It is therefore an object of the present invention to provide an efficient system and method of echo cancellation for use in a full-duplex speakerphone, which exhibits a fast convergence and is less sensitive to noise.

SUMMARY OF THE INVENTION

The above objects have been met by a frequency-domain adaptive filter which performs a novel weighting operation to stabilize the adaptive behavior of the filter, and which performs the constraint operation directly on the coefficients of the frequency-domain coefficient vectors. The direct constraint adaptation approach of the present invention schedules the direct constraint operation in a highly efficient manner so that only the most necessary vectors will be constrained while the other vectors allow a small amount of circular component build-up to accumulate until those vectors are in turn constrained.

The invention takes advantage of the fact that practically all room responses are known to have a decaying impulse response. The invention puts greater "weight" on the short delay coefficients than the longer delay coefficients in a manner that is approximately proportional to the strength of the delayed impulse response for a given delay, and uses this knowledge to make a constraint scheduling mechanism which schedules the constraint operation on the short delay coefficient vectors with greater frequency than for the longer delay coefficients.

In principle, the goal is to avoid polluting the coefficients of the frequency-domain coefficient vectors with any significant degree of circular coefficient characteristic. The invention meets this goal by constraining directly on the coefficients of the frequency-domain coefficient vectors. The weighting scheme has the effect of accelerating the convergence of the adaptive filter by putting more emphasis on the shorter delay coefficients. The net effect is that the adaptive filter converges faster and the coefficients remain practically constrained with very few computations required for the constraint operation.

BEST MODE FOR CARRYING OUT THE INVENTION

Figure 1:
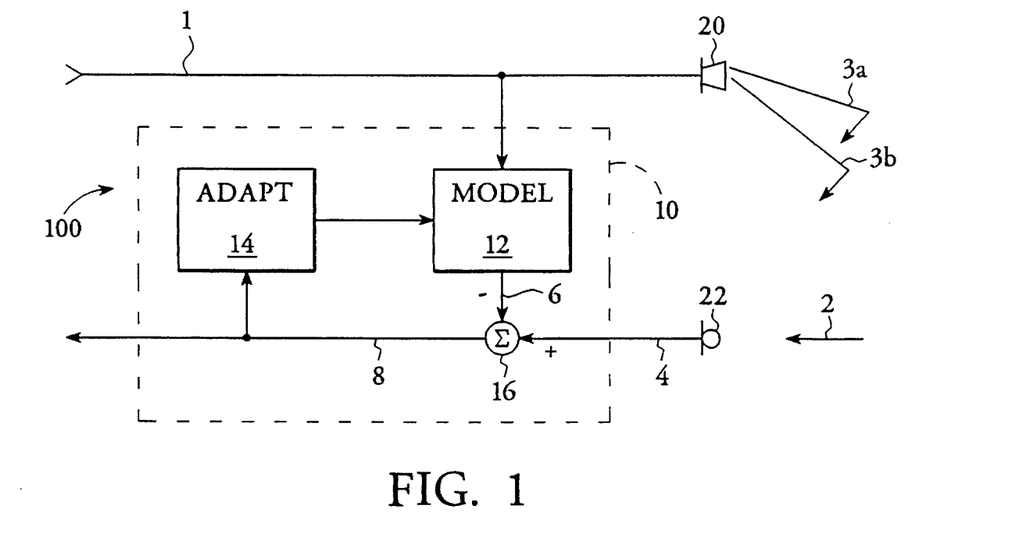
FIG. 1 shows the general configuration of an adaptive echo cancellet (AEC).

In general, an acoustic echo canceller (AEC) is an adaptive filter which utilizes a model of the acoustic response of a room. FIG. 1 shows the basic components of a typical AEC which employs a frequency-domain adaptive filter 100. An incoming signal from a far-end caller is sent along the input line 1, and is broadcast into a room by the loudspeaker 20 of a speakerphone, resulting in the production of echoes 3a, 3b. A near-end caller speaks into the microphone 22 of the speakerphone, producing a speech component 2. The echoes 3a, 3b and the speech component 2 are combined in the microphone 22 to form an outgoing signal that is sent along line 4. The adaptive filter 100 contains a linear model 12 of the acoustic characteristics of the room, which generates an estimate 6 of the return echo signals 3a, 3b created in the room. A subtractor 16 subtracts the predicted echo 6 from the outgoing signal 4 to form a "clean" signal that is sent along the transmit line 8. The clean signal also serves as the error signal which the adapter 14 uses to adapt the model 12.

Figure 2:
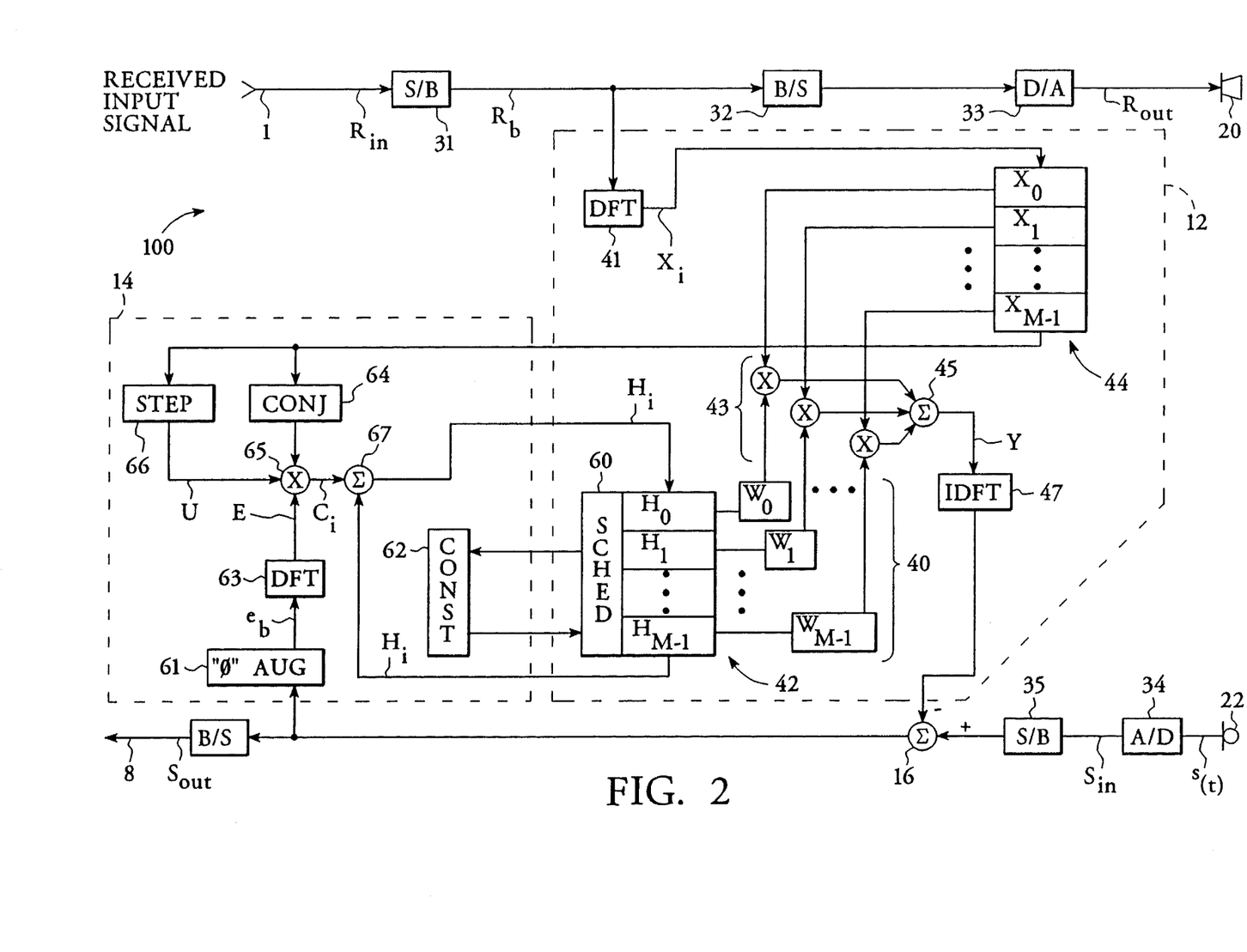
FIG. 2 depicts the arrangement of a block frequency-domain adaptive filter in accordance with a preferred embodiment of the present invention.
Figure 3:
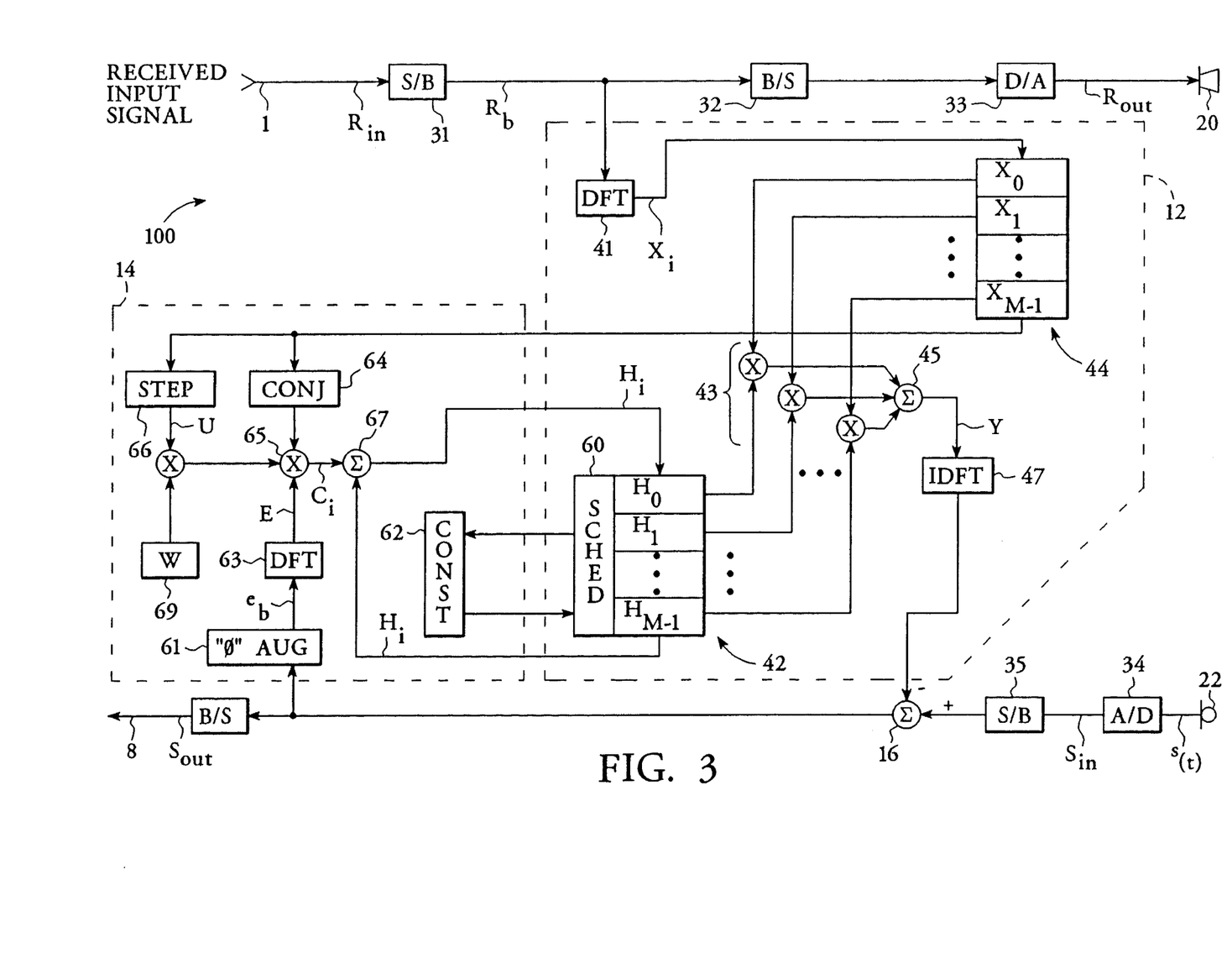
FIG. 3 depicts the arrangement of a block frequency-domain adaptive filter in accordance with another embodiment of the present invention.

FIGS. 2 and 3 detail preferred embodiments of a frequency-domain adaptive filter 100 in accordance with the present invention as applied to an AEC. Following is a description of the elements common to both embodiments, wherein the common elements between FIGS. 2 and 3 have the same reference numerals. A discussion of the operation of each embodiment is then presented, along with additional detail of the elements specific to each embodiment.

Using FIG. 2 as a reference, a frequency-domain adaptive filter 100 is shown wherein a received input signal $R_{in}$ is presented along an input line 1 in the form of a serial stream of digitized samples of an analog input signal. A serial to block (S/B) converter 31 gathers the digitized samples $R_{in}$ into blocks of N/2 samples, and concatenates a current block of $R_{in}$ samples with the previous block of $R_{in}$ samples to form an N-sample real vector $R_b$. A block to serial (B/S) converter 32 and a digital to analog (D/A) converter 33 operate to revert the N-sample real vectors to an analog signal $R_{out}$ for broadcast into the room by a loudspeaker 20. Typical values for N include 64, 128, 256, 512 and 1024 samples, the particular value being based upon design parameters such as desired system throughput, memory constraints and other hardware considerations.

Assuming that the room response in the time-domain is denoted by h(t), the echo resulting from the acoustic reflections of an input signal x(t) is defined by the convolution of x(t) with h(t). The model 12 of the AEC filter 100 takes advantage of the fact that a convolution in the time-domain is equivalent to multiplication in the frequency-domain. The model 12 includes an array 42 of M frequency-domain coefficient vectors $H_0 \ldots H_{M-1}$ which approximate the time-domain response h(t). Each vector $H_i$ represents an estimation of the echo response for an interval of time. By convention, vector $H_0$ represents the echo response for a first interval of time, while vector $H_{M-1}$ represents the echo signal during the M'th time interval. Thus, a vector $H_i$ represents the echo response delayed by an interval of time with respect to the previous vector $H_{i-1}$. Each vector $H_i$ in the array 42 is the DFT representation of the time-domain impulse response for the given time interval and consists of N/2 +1 complex coefficients, known as "bins," which represent the frequency components of the corresponding time-domain echo response. The frequency part of each of the 0 (zero) bin and the N/2 bin is zero, making the storage requirement N words.

The model 12 also includes a first-in, first-out buffer (FIFO) 44. The FIFO 44 has a depth of M input vectors $X_0 \ldots X_{M-1}$, where each input vector $X_i$ has a width of N/2+1 bins. A Discrete Fourier Transform (DFT) 41 transforms the N-sample real vectors $R_b$ into frequency-domain input vectors $X_i$ which by use of symmetry properties are of size N/2+1 complex values, and are stored in the FIFO 44. In digital processors, the FIFO is normally implemented as a circular queue in RAM. The most efficient order of storage is dependent upon the peculiarities of the digital processor used. In general, however, when an input vector $X_i$ is created and pushed onto the FIFO 44, it is marked as block index zero (0) with subsequent input vectors having their index incremented by one.

A multiplication means 43 and summing means 45 provide for the frequency-domain equivalent of the time-domain convolution of x(t) and h(t). The resulting echo vector Y is an estimate, in the frequency-domain, of the actual echo produced in the room. An inverse DFT (IDFT) 47 converts the echo vector Y into a time-domain real vector of N/2 linearly convolved samples appearing at a summing means 16.

Although a fast Fourier transform (FFT) is contemplated for the DFTs, no specific implementation of DFT is required. Likewise, an inverse FFT is contemplated for the IDFT 47, but is not restricted to any particular implementation of IDFT. It is noted that persons skilled in the art will realize that a Hilbert transformation can be applied to convert the time-domain input data into complex numbers prior to transformation to the frequency-domain by the DFT 41, since FFTs generally operate more efficiently with complex data.

A microphone 22 picks up the near-end talker speech and the echoes produced in the room, and generates a time-domain outgoing signal s(t). An A/D converter 34 generates a stream of digitized samples $S_{in}$, which are then organized into N/2 linearly convolved sample blocks by an S/B converter 35. The summing means 16 subtracts the N/2 sample blocks of the approximated echo Y from the N/2 sample blocks of $S_{in}$ to produce digitized samples of a "clean" signal $S_{out}$. The clean signal $S_{out}$ follows two paths: The signal continues along the transmit line 8 for subsequent transmission to the far-end caller. At the same time, the signal serves as an error signal $e_b$ which the filter 100 uses to adapt the model 12.

The adaptation means 14 consists of a DFT 63 which produces a frequency-domain error vector E from the time-domain digitized error signal $e_b$. The error vector E is correlated with the input vectors $X_i$, stored in the FIFO 44, through operation of the conjugation means 64 and the step-size adjustment means 66. Each frequency-domain coefficient vector $H_i$ is adapted by the results of the cross-correlation through a summing means 67. Finally, the constraint scheduler 60 subjects certain ones of the adapted frequency-domain coefficient vectors $H_i$ in the array 42 to a constraint operator 62.

The discussion will now turn to the operation of an AEC adaptive filter in accordance with the present invention as shown in the preferred embodiment of FIG. 2. In general, the sequencing of processing in the filter 100 is governed by the synchronized arrival of the digitized samples at $R_{in}$ and $S_{in}$ of the received input signal and microphone input signal respectively. When a new block of N/2 samples is received, the convolution operation in the model 12 commences, resulting in the generation of a "clean" signal $S_{out}$, which is then queued along the path 8 and eventually to the far-end. In line with the path 8, there may be additional post-processing of the clean signal $S_{out}$ to further enhance the signal.

The adaptation portion of the filtering process commences upon receipt of the "clean" signal $S_{out}$, now referred to as the error signal $e_b$, at the adaptation means 14. The adaptation means 14 is responsible for adapting the coefficient vectors $H_i$ in the array 42, and for constraining the coefficient vectors according to a constraint scheduler 60. The adaptation is performed in the time period that remains while the next N/2 samples are being gathered and queued into blocks by the S/B converter 31 and 35. The number N/2 is known as a "block period." The AEC filter of the present invention typically operates with a cycle time of about 125 microseconds, corresponding to an 8000 Hz operating frequency.

When a new block of N/2 $R_{in}$ samples is received, it is concatenated with the previously received block to form an N-sample real vector $R_b$, which is then transformed into the frequency-domain via DFT 41, and pushed onto the FIFO 44. This action initiates the convolution operation to produce an approximation Y of the actual echo produced in the room.

The convolution operation of the preferred embodiment of the present invention differs from the conventional structure of previous block frequency-domain adaptive filters described in the literature. FIG. 2 shows a weight adjustment means 40 for adjusting the coefficient vectors $H_i$, each coefficient vector $H_i$ having a corresponding weight adjustment vector $W_i$. The convolution operation, in accordance with the present invention, begins by multiplying the N/2+1 bins $h_{ib}$ of each vector $H_i$ by the corresponding weight adjustment $W_{ib}$. The bins of these adjusted coefficient vectors are then multiplied by the corresponding bins of the input vectors $X_i$. The resulting final product terms for each bin are summed by the summing means 45 to produce a single frequency-domain vector of length N/2+1, which is the frequency-domain approximation of the echo response y. The following equations describe the operation:

$$Y = \sum_{i=0}^{M_b-1} \{(H_i * W_i) * X_i\} \quad (1a)$$

$$y_b = \sum_{i=0}^{M_b-1} \{h_{ib} * w_{ib} * x_{ib}\} \quad (1b)$$

where

* in the vector equation (1a) represents element-by-element multiplication,

M is the depth of the FIFO, b is the bin index and b=0 . . . N/2, i is the FIFO index, $M_b$ is the FIFO depth for a given bin index and $Y_b$ is the echo coefficient value for a given bin index, $h_{ib}$ is the complex coefficient value for a given FIFO index and bin index, $x_{ib}$ is the complex FIFO value for a given FIFO index and bin index, and $w_{ib}$ is the weight adjustment for a given FIFO index and bin index.

It may not be necessary to obtain the product terms for all of the input vectors $X_i$ in the FIFO 44 for a given bin. For example, the energy in a given bin (i.e. a given frequency component) for the longer delayed input vectors may be so attenuated that they can be ignored. This presents an opportunity to save on computations by limiting the depth of the FIFO 44 for certain bins when performing the convolution. The value $M_b$ controls the depth of the FIFO 44 by taking on different values between 0 and M-1 for each bin index b. It is generally noted that performance of the convolution operation can be affected by having different values for $M_b$, and that other criteria for selecting $M_b$ values are possible.

The weight adjustment means 40 is based on the fact that acoustic echo, i.e. the impulse response, in ordinarily constructed rooms will always decay. The weight adjustments $W_{ib}$ are determined based on the following a priori assumptions about the expected impulse response:

1) The direct coupling between the loudspeaker and the microphone has a transfer function, i.e. impulse response, that is independent and separable from the indirect coupling.
2) The envelope of the impulse response of indirect coupling, i.e. echo from walls, furniture, etc. which do not have a direct path from the loudspeaker to the microphone, has the characteristic that it decays in an exponential fashion.
3) The direct coupling impulse response is principally a function of the physical distance between the loudspeaker and the microphone, the queuing delay of A/D and D/A samples and the impulse responses of the A/D, D/A, microphone and loudspeaker.
4) The direct coupling impulse response is only of interest in the first blocks which would encompass the bulk delay due to the physical distance between the loudspeaker and microphone and the delay due to queuing samples to the D/A and from the A/D. The indirect impulse response governs the impulse response for the remaining blocks.
5) The strength of the direct coupling, for ordinary rooms, is always greater than the strength of the first indirect path.

The weighting for the blocks which correspond to the direct coupling impulse response is dependent on the configuration, experimental testing and the judgment of the designer. The weighting for the remaining blocks follows an exponentially decreasing function.

In the most general case, the weight adjustment means 40 can be represented by vectors $W_i$ of N/2+1 weight values $W_{ib}$, as shown in equations (1a) and (1b). The weights are based on the a priori determination of the expected decay of the echo for a given frequency bin. The weight values $w_{ib}$ are fixed so that the weight is approximately proportional to the magnitude of the expected envelope of the echo for a given delay corresponding to the FIFO index. Nevertheless, it is expected that the vectors $W_i$ will be subject to some fine-tuning for a particular implementation of the filter 100.

In practice, it may not be efficient in terms of computer cycles and memory requirements to have a finely tuned set of weight vectors $W_i$ available for each bin. Therefore, it is more pragmatic to have a single M length vector of weights W which approximates the effect of the echo decay for the most important bins; i.e. acoustic energy in the 100 Hz–2000 Hz range. With this simplification, equations (1a) and (1b) become:

$$Y = \sum_{i=0}^{M_b-1} \{H_i * W * X_i\} \quad (2a)$$

$$y_b = \sum_{i=0}^{M_b-1} \{h_{ib} * w_i * x_{ib}\} \quad (2b)$$

where the terms are defined in equation (1b), and $w_i$ is the weight adjustment for a given FIFO index, and is independent of the bin index.

Whether the weighting means 40 is in scalar form or in vector form, the values are selected so as to attenuate, to a greater degree, the estimated echo responses which occur later in time.

The weighting technique of the preferred embodiment has four strong advantages: 1) it forces the coefficients $H_i$ to grow and stabilize to values all of which are approximately in the same magnitude range -enhanced dynamic range; 2) it optimizes adaptation speed and ultimate convergence; 3) it avoids a stalling effect prevalent in fixed-point implementations of the adaptive filter wherein the coefficients remain unchanged with subsequent updates and 4) it permits the efficient scheduling of the constraint operation in the adaptation portion 14 of the filter, which will be described in greater detail below.

The convolution operation of the model 12 results in a frequency-domain estimate Y of the echo produced in the room. Still referring to FIG. 2, the frequency-domain estimate Y is processed by the IDFT 47 to produce a time-domain echo estimate vector of N samples. The first N/2 samples of the time-domain echo vector contain circular convolution components and are ignored, using only the second N/2 linearly convolved samples for subsequent processing. The serial sample stream $S_{in}$ of the microphone input data is converted into a block of size N/2 by the S/B converter 35. The N/2 samples of the echo estimate vector are subtracted from the $S_{in}$ block to produce an output signal $S_{out}$, representing a "clean" signal to be subsequently transmitted to the far-end. The output signal $S_{out}$ also serves as an N/2 sample error vector $e_b$ used to adapt the filter 100.

Processing of the error vector $e_b$ takes place in the adaptation means 14, and begins with a well understood technique known as "augmenting with zeroes" 61. The error vector $e_b$ is an N-sample vector, where the first N/2 coefficients are set to a value of zero and the second N/2 coefficients are filled with the N/2 real samples of the output signal $S_{out}$. The resulting zero augmented error vector $e_b$ is subjected to a transformation by the DFT 63 to produce a frequency-domain representation E of the error vector. The coefficient vectors $H_i$ are updated by correlating the frequency-domain vector E with each of the input vectors $X_i$ from the FIFO 44. The conjugation means 64, step-size means 66 and multiplier form a correlation vector $C_i$ corresponding to each coefficient vector $H_i$. For each coefficient vector $H_i$, the individual bins are adapted by coefficients of the corresponding correlation vector $C_i$, and proceed according to the following equations:

$$H_i = H_i + U * E * X^*_b \quad (3a)$$

$$h_{ib} = h_{ib} + u_b * e_b * x^*_{ib} \quad (3b)$$

where

* in the vector equation (3a) represents element-by-element multiplication,
b is the bin index and b=0 ... N/2,
i is the vector index,
$M_b$ is the FIFO depth for a given bin index and $M_b \leq M$,
$h_{ib}$ is the coefficient value for a given bin index in a given coefficient vector,
$u_b$ is the step size for a given bin index,
$e_b$ is the error value for a given bin index, and
$x^*_{ib}$ is the complex conjugate FIFO value for a given vector and bin index.

Recall in the above discussion of the convolution operation that it may not be necessary to obtain the product terms for all of the input vectors in the FIFO 44 for a given bin b. In such a case, not all of the coefficient vectors $H_i$ will be involved in the convolution operation for the given bin. It follows that those coefficient vectors which did not participate in the convolution need not be updated in the subsequent adaptation step, thus allowing for further improvements in system throughput. This fact is reflected by the value $M_b$, which specifies how many of the M coefficient vectors $H_i$ are adapted for a particular block.

The step size vector U is determined based upon the estimate of the power for a given bin. In general, the step size is defined by:

$$U = u_m / P \quad (4a)$$

$$u_b = u_m / p_b \quad (4b)$$

where $u_m$ is the master step size, and $p_b$ is the power estimate for that bin.

This method of setting the step size is commonly referred to as the Normalized Least Mean Squared technique, or NLMS. Many variations of this theme are possible, and the topic has been extensively discussed in the adaptive filter literature.

Adaptation of the coefficients in accordance with the invention allows the coefficients to accumulate a certain amount of circular components in addition to the predominant and desired linear component. This results in a condition where the frequency-domain convolution causes a certain amount of circular (unwanted) convolution to take place, along with the desired linear convolution. These circular components are removed by the constraint mechanism of the present invention depicted in FIG. 2 by the scheduler 60 and the constraint operator 62. After the coefficient vectors $H_i$ have been adapted by way of the correlation update, the scheduler 60 selects certain ones of the adapted coefficient vectors to be processed by the constraint operator 62. The following summarizes the constraint mechanism in accordance with the present invention:

$$H_i = DFT\{(IDFT(H_i) * C\} \quad (5)$$

where

* represents element-by-element multiplication, i is selected in accordance with a constraint schedule, $H_i$ is the coefficient vector to be constrained, and C is a constraint vector.

The constraint vector C is an N element vector, and is always defined as having a value of 1 (one) for the first N/2 elements and 0 (zero) for the last N/2 elements.

The approach of the present invention offers greatly improved efficiency over the prior art technigues for two reasons: 1) the circular coefficient components build up relatively slowly and 2) the weighting adjustment technique described above causes less circular error to accumulate for the long delay coefficients. The scheduler 60 therefore operates to apply the constraint operator 62 much more often to the short delay coefficient vectors $H_i$ (i.e. the vectors having the lower index numbers) than to the long delay vectors. The net effect is that the coefficients, for practical purposes, remain fully constrained with a very low demand on CPU cycles.

The scheduler 60 must possess the following characteristics:

1) The frequency at which a particular index is constrained follows a function which is approximately proportional to the weight applied at the convolution stage for the present block index.

2) The interval between constraint operations on a given block index is approximately constant.

Figure 4A:
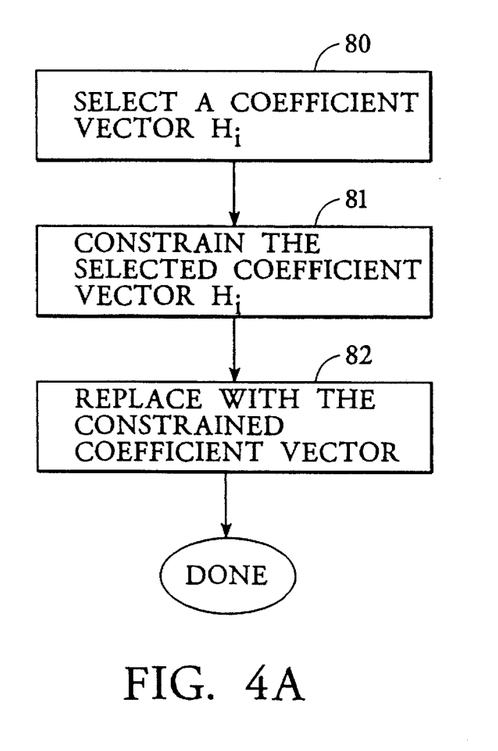
FIGS. 4A and 4B detail an embodiment of the constraint operation in accordance with the present invention.
Figure 4B:
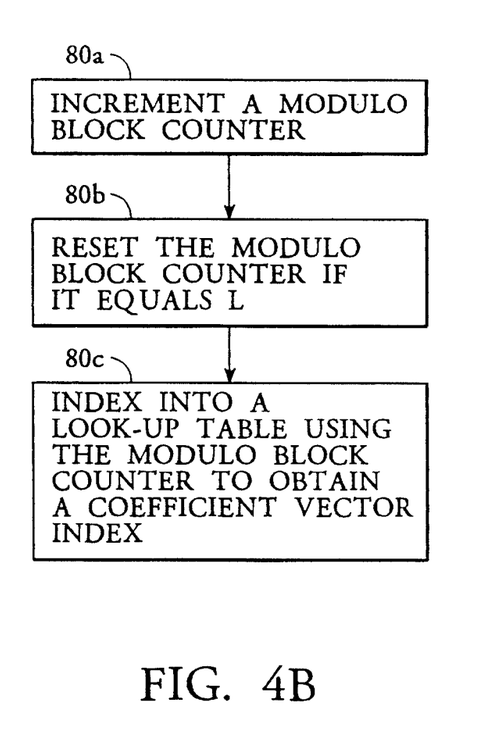
Figure 5:
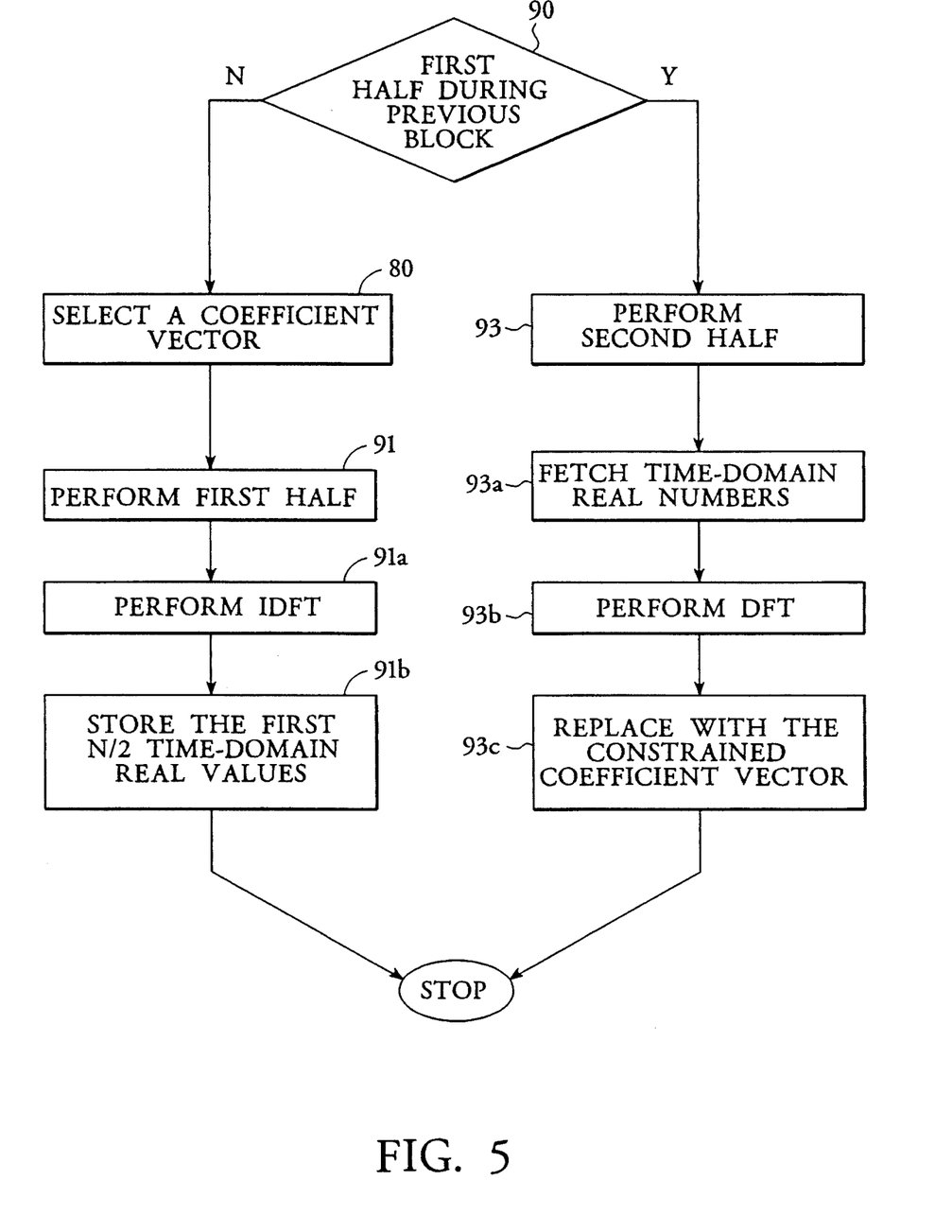
FIG. 5 details an alternative embodiment of the constraint operation in accordance with the present invention.

Depending on the trade-off in CPU cycles versus performance, the constraint operation of equation (5) can be performed more than once per block, thereby constraining more than one coefficient vector $H_i$ per block period. At the other end of the performance scale, the constraint operation of equation (5) can be performed in a number of substeps, over a period of two or more blocks. In the latter case, the coefficient vectors $H_i$ are updated at a much slower rate, for example once for every two block periods. FIGS. 4A, 4B and 5 are flow diagrams outlining these two approaches.

FIGS. 4A and 4B depict the flow diagrams of an embodiment of the constraint mechanism of the present invention wherein one or more constraint operations are performed for each block. The flow diagram of FIG. 4A outlines the processing which takes place in both the scheduler 60 and the constraint operator 62 (FIGS. 2 and 3). Processing commences in the scheduler 60 by selecting 80 a coefficient vector $H_i$ from the array 42 (FIGS. 2 and 3) to be constrained. Turning to FIG. 4B, it is shown that the step of selecting 80 (FIG. 4A) involves a modulo counter which is incremented 80A each time the constraint operation is performed, and is reset 80B to zero when the value of the counter reaches a selected modulo number L. The modulo counter serves as an index into a look-up table of size L, containing a list of coefficient vector indices. The look-up table is indexed by the counter value 80C to obtain the index of a candidate coefficient vector. Referring back to FIG. 4A, processing continues in the constraint operator 62, by constraining 81 the selected coefficient vector according to equation (5). Upon completion, the constrained coefficient vector $H_i$ is returned 82 to the array 42 (FIGS. 2 and 3).

FIG. 5 depicts the flow diagram of an embodiment of the constraint mechanism of the present invention wherein the constraint operation is performed in two periods. In the most general case, processing in the constraint operator 62 (FIGS. 2 and 3) could be subdivided into two or more substeps with one or more substeps being performed in each block period. For example, the constraint operation might be divided into 5 substeps, where substeps 1 and 2 are performed during a first block period, substeps 3 and 4 are executed in a second block and substep 5 is executed in a third block. The particular embodiment shown in FIG. 5 divides the constraint operation into two portions: 1) execute the first half of the constraint operation 91, which includes the substeps of performing 91A an IDFT on the coefficient vector $H_i$ and storing 91B the first N/2 time-domain real values in memory; and 2) execute the second half of the constraint operation 93, which includes the substeps of fetching 93A the stored real values, performing 93B a DFT and replacing 93C the constrained coefficient vector $H_i$ back to the array 42 (FIGS. 2 and 3). The step 91B of storing only the first N/2 time-domain real values in memory is in effect the actual constraining operation, since the second N/2 values are zeroed out in the process. See equation (5).

In accordance with the embodiment of FIG. 5, the scheduler 60 (FIGS. 2 and 3) keeps track of which coefficient vector is being constrained, while the scheduler 62 keeps track of which of the two subdivided steps was last performed. If the first half of the constraint operation 91 was performed during the previous block period, then processing commences with the second half 93 of the constraint operation in the current block period to finish the constraint operation on the coefficient vector $H_i$, in the manner as described above. If the second half of the constraint 93 was performed during the previous block period, then processing begins with the first half 91 of the constraint operation. The step of selecting 80 another vector $H_i$ proceeds in the same manner as shown in steps 80A–80C of the embodiment of FIG. 4B.

This concludes the description of the preferred embodiment, as shown in FIG. 2, of the present invention. The discussion will now turn to the operation of an adaptive filter in accordance with the present invention as shown in the embodiment of FIG. 3. FIG. 3 depicts an adaptive filter 100 in an AEC application which is very nearly identical to the filter of FIG. 2. The difference lies in the placement of the weighting means 40 of FIG. 2, which appears in the model 12. Instead, FIG. 3 shows a weighting means 69 as part of the adaptation means 14.

The step size means 66 controls the rate of adaptation. An aggressive (large) step size can cause the whole system to go unstable, while a small step size will be slow to converge to the true solution. Referring to equation (4b) above, the coefficients $u_b$ of the step size vector U are a function of the power $p_b$ in the DFT bin b. In general, bins with high power must make the step size less to maintain stability in the coefficients $H_i$ of the filter. Although the step size varies for each bin as a function of power, the step sizes can be further attenuated so that they all follow the same decaying function. The weighting means 69 of FIG. 3 serves to provide such a decaying function. As a result, the cross-correlation and adaptation described in equation (3b) above is modified with the weighting of equation (1b), and proceeds according to the following:

$$H_i = H_i + (U * W_i) * E * X^*_i \qquad (6a)$$

$$h_{ib} = h_{ib} + (u_b * w_{ib}) * e_b * x^*_{ib} \qquad (6b)$$

where
* in the vector equation (6a) represents element-by-element multiplication,
b is the bin index and b=0 . . . N/2,
i is the vector index,
$M_b$ is the FIFO depth for a given bin index and $M_b \leq M$,
$h_{ib}$ is the coefficient value for a given bin index in a given coefficient vector,
$u_b$ is the step size for a given bin index,
$w_{ib}$ is the weight adjustment for a given vector index and bin index,
$e_b$ is the error value for a given bin index, and
$x^*_{ib}$ is the complex conjugate FIFO value for a given vector and bin index.

The previous discussion with respect to equation (3b) and equation (1b) applies to the terms in equation (6b), and thus does not need to be repeated here.

In the most general case, the weighting means 69 is a vector W of scalar quantities exhibiting an exponentially decaying behavior. Thus equations (6a) and (6b) above would be modified as follows:

$$H_i = H_i + (U * W_i) * E * X^*_i \qquad (7a)$$

$$h_{ib} = h_{ib} + (u_b * w_{ib}) * e_b * x^*_{ib} \qquad (7b)$$

The weight adjustment W in equation (7a) is now a vector W of scalars, one scalar value for each bin b. This is more clearly shown as the weight adjustment $w_{ib}$ of equation (7b). The weighting is different for each bin b so that each bin can be adjusted to decay at a different rate.

To summarize, the block frequency-domain adaptive filter as shown in the embodiment of FIG. 2 is particularly effective for fixed-point digital signal processing. It offers the benefits of being less sensitive to noise for the long delay coefficients; it is more accurate because of the increased dynamic range resulting from weight adjustment during the convolution operation; and it avoids the stalling effect prevalent in fixed-point implementations. The adaptive filter of the embodiment of FIG. 3 offers the anticipated feature that the weighting vector can dynamically change as well as the coefficient vectors, as the filter adapts to the acoustic characteristics of the room being modeled. The system of FIG. 3 is only appropriate in a floating-point or high-precision fixed-point architecture in order to avoid stalling of the coefficients.

The adaptive filter of the present invention has been disclosed in the context of full-duplex speakerphone applications. It is readily apparent that the use of adaptive filters in other environments is possible. For example, an adaptive filter in accordance with the present invention may be used to cancel noise which is generated by a noise source such as a fan or a duct by using a measured signal at the noise source as the reference signal for the adaptive filter.

It will be appreciated by those skilled in the pertinent art that all of the above-described capabilities can be carried out by a variety of hardware configurations. For example, a single microprocessor, with its required devices, can perform all of the functions and computations described. Alternatively, discrete devices can be arranged or perform the particular, or equivalent functions described above. Moreover, additional devices not mentioned may be available in the future to carry out the functions of the present invention, or their equivalents, and are intended to fall within the scope of the present invention. Persons in the relevant art will be able to determine which hardware and software configuration is best for a particular application of the system and methods described.

I claim:

1. A frequency-domain adaptive filter comprising:

a first input signal line to receive an input signal;

a second input signal line to receive a send signal;

a plurality of memory stores, each said memory store having a frequency-domain coefficient vector;

a plurality of weights, each said weight corresponding to one of said memory stores;

transformation means coupled to said first input signal line for producing a plurality of frequency-domain input blocks from said input signal;

response means for producing a time-domain response signal from said coefficient vectors and said frequency-domain input blocks, including first means coupled to said plurality of memory stores for multiplying the frequency-domain coefficient vector in each said memory store with the weight corresponding to said memory store to produce weighted coefficient vectors, second means for multiplying said weighted coefficient vectors with said frequency-domain input blocks to obtain product terms, means for summing together said product terms, and means for transforming said summed product terms to the time domain, thereby producing said time-domain response signal;

combining means for producing a filtered send signal from said time-domain response signal and said send signal;

an outgoing signal line coupled to said combining means to transmit said filtered send signal; and means for adapting said plurality of coefficient vectors, including:

error means for producing a frequency-domain error vector from said filtered send signal;

correlation means for producing correlation terms from said frequency-domain error vector and said frequency-domain input blocks;

summing means coupled to said plurality of memory stores for adding said correlation terms to said coefficient vectors in said memory stores; and constraint means coupled to said plurality of memory stores for selecting at least one of said memory stores and for constraining the coefficient vector stored in said selected one of said memory store.

2. The frequency-domain adaptive filter of claim 1, wherein each said weight is a vector of numerical factors.

3. The frequency-domain adaptive filter of claim 1, wherein said weight corresponding to a first of said plurality of memory stores has a maximum weight value and said weights corresponding to subsequent ones of said memory stores have decreasing weight values.

4. The frequency-domain adaptive filter of claim 3, wherein said weight values are based upon a monotonically decaying function.

5. The frequency-domain adaptive filter of claim 1 further including a speakerphone having a speaker coupled to said first input signal line and a microphone coupled to said second input signal line; and wherein said input receive signal is a telephone signal that is broadcast by said speaker into a room, and said send signal is an output of said microphone.

6. A method of filtering an outgoing signal by adaptively estimating the linear transfer function of a mainly acoustic system between an incoming reference signal and said outgoing signal, said outgoing signal including echo signals produced by said mainly acoustic system in response to said reference signal, said method of filtering comprising the steps of:

(a) providing an array of coefficient vectors to produce a frequency domain model of said linear transfer function, said array of coefficient vectors representing an initial estimate of said linear transfer function;

(b) selecting a plurality of weights, each said weight corresponding to an entry in said array of coefficient vectors; and (c) iterating the following substeps of:

(i) receiving said reference signal from a first input source;

(ii) transforming said reference signal to produce frequency-domain input blocks;

(iii) computing a time-domain response from said frequency-domain input blocks and said array of coefficient vectors, including multiplying said array of coefficient vectors with said corresponding plurality of weights to produce weighted coefficient vectors, multiplying said weighted coefficient vectors with said frequency-domain input blocks to produce product terms, summing said product terms to produce a sum term, and transforming said sum term to produce said time-domain response, said time-domain response representing an estimated signal produced by said mainly acoustic system in response to said reference signal;

(iv) receiving said outgoing signal from a second input source;

(v) subtracting said time-domain response from said outgoing signal thereby filtering said outgoing signal, whereby said echo signals are substantially canceled therefrom;

(vi) transmitting said filtered outgoing signal; and (vii) adapting said array of coefficient vectors, said substep of adapting including the substeps of:

(A) generating a frequency-domain error vector from said filtered outgoing signal;

(B) correlating said frequency-domain error vector with said frequency-domain input blocks to produce correlation terms;

(C) adding said correlation terms to said array of coefficient vectors; and (D) following said substep of adding, selecting at least one entry of said added array of coefficient vectors and constraining the coefficient vector contained in said selected entry, including basing said substep of selecting on said plurality of weights such that continued iterations of said substep of selecting results in each vector of said added array of coefficient vectors being selected at a frequency proportional to the weight corresponding to each said vector, whereby said added array of coefficient vectors more closely estimates said linear transfer function than a previous iteration.

7. The method of claim 6 wherein each of said weights is a vector of numerical factors and said selecting said plurality of weights includes selecting numerical factors of less than one.

8. The method of claim 6 wherein said selecting said plurality of weights includes selecting an exponentially decaying function and computing a value for each said weight based upon said exponentially decaying function, thereby approximating the reverberation decay of said acoustic system.

9. The method of claim 6, wherein each entry of said array of coefficient vectors has a unique identification number; and the method further includes selecting a list containing a sequence of said unique identification numbers, wherein said substep of selecting at least one entry includes indexing into said list to obtain one of said unique identification numbers and selecting the corresponding entry.

10. The method of claim 9, wherein said step of iterating includes incrementing a counter with each iteration, and said step of indexing includes computing an N modulo value of said counter, where N is the size of said list containing said unique identification numbers.

11. A frequency-domain adaptive filter for canceling acoustic echo in a transmit signal, said acoustic echo produced by an acoustic system in response to an input signal, said filter comprising:

means for receiving said input signal;

means for receiving said transmit signal;

transformation means for generating a plurality of frequency-domain input vectors from said input signal;

a plurality of frequency-domain coefficient vectors, each of said coefficient vectors approximating said acoustic echo at uniformly increasing delays in time;

a plurality of weights having a one-to-one correspondence with said coefficient vectors;

multiplication means for multiplying each of said coefficient vectors with said corresponding weight to produce a plurality of weighted coefficient vectors;

means for generating a time-domain estimated echo signal from said frequency-domain input vectors and said weighted coefficient vectors;

means for subtracting said time-domain estimated echo signal from said transmit signal to produce a filtered signal;

output means for transmitting said filtered signal; and adaptation means for updating said frequency-domain coefficient vectors, including:

error means for generating a frequency-domain error vector from said filtered signal;

means for generating correlation terms from said frequency-domain error vector and said frequency-domain input vectors;

means for adding said correlation terms to said frequency-domain coefficient vectors, thereby adjusting said coefficient vectors;

scheduling means for selecting at least one of said adjusted coefficient vectors, said scheduling means preferentially selecting adjusted coefficient vectors which correspond to shorter delays in time relative to others of said adjusted coefficient vectors; and constraint means for constraining said selected adjusted coefficient vectors.

12. The frequency-domain adaptive filter of claim 11 wherein each of said weights is a vector of numerical factors, each said numerical factor being less than one.

13. The frequency-domain adaptive filter of claim 11 wherein each of said weights represents a numerical factor, each of said numerical factors being based upon an exponentially decaying function, thereby emulating the acoustic response envelope of said acoustic system.

14. A frequency-domain adaptive filter comprising:

a first input signal line to receive an input signal;

a second input signal line to receive a send signal;

a plurality of memory stores, each said memory store having a frequency-domain coefficient vector;

transformation means coupled to said first input signal line for producing a plurality of frequency-domain input blocks from said input signal;

response means for producing a time-domain response signal from said coefficient vectors and said frequency-domain input blocks;

combining means for producing a filtered send signal from said time-domain response signal and said send signal;

an outgoing signal line to transmit said filtered send signal; and means for adapting said plurality of coefficient vectors, including:

error means for producing a frequency-domain error vector from said filtered send signal;

correlation means for producing correlation terms from said frequency-domain error vector and said frequency-domain input blocks, said frequency-domain error vector having a corresponding step size vector and a corresponding weighting vector, said correlation means including means for producing a plurality of complex conjugate values of said frequency-domain input blocks means for multiplying said step size vector, said weighting vector and said complex conjugate values to produce said correlation terms;

summing means coupled to said plurality of memory stores for adding said correlation terms to said coefficient vectors in said memory stores; and constraint means coupled to said plurality of memory stores for selecting at least one of said memory stores and for constraining the coefficient vector stored in said selected one of said memory store.

15. The frequency-domain adaptive filter of claim 14 further including a speakerphone having a speaker coupled to said first input signal line and a microphone coupled to said second input signal line, wherein said input receive signal is a telephone signal that is broadcast by said speaker into a room, and said send signal is an output of said microphone.

16. The frequency-domain adaptive filter of claim 14 wherein said weighting vector includes weights which are based upon a monotonically decaying function.

* * * * *